E. F. HATHAWAY & C. LEA.
MACHINE FOR HANDLING TUFT YARNS FOR CARPET LOOMS.
APPLICATION FILED MAY 23, 1908.
1,152,380.
Patented Aug. 31, 1915.
7 SHEETS—SHEET 1.
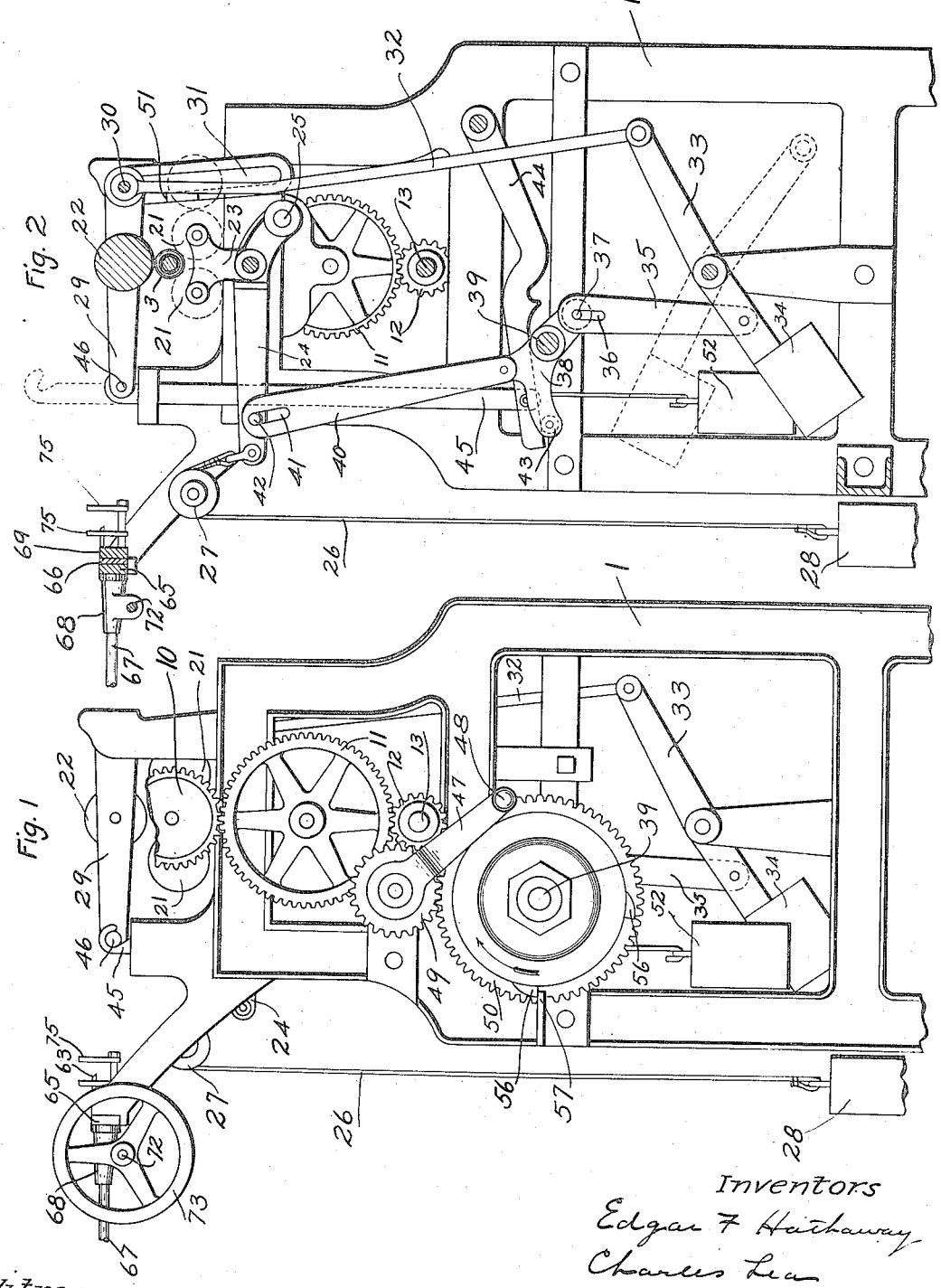
Witnesses
Robert H. Kammler.
Edwin P. Luck
Inventors
Edgar F. Hathaway
Charles Lea
by Emery Booth
Attorneys

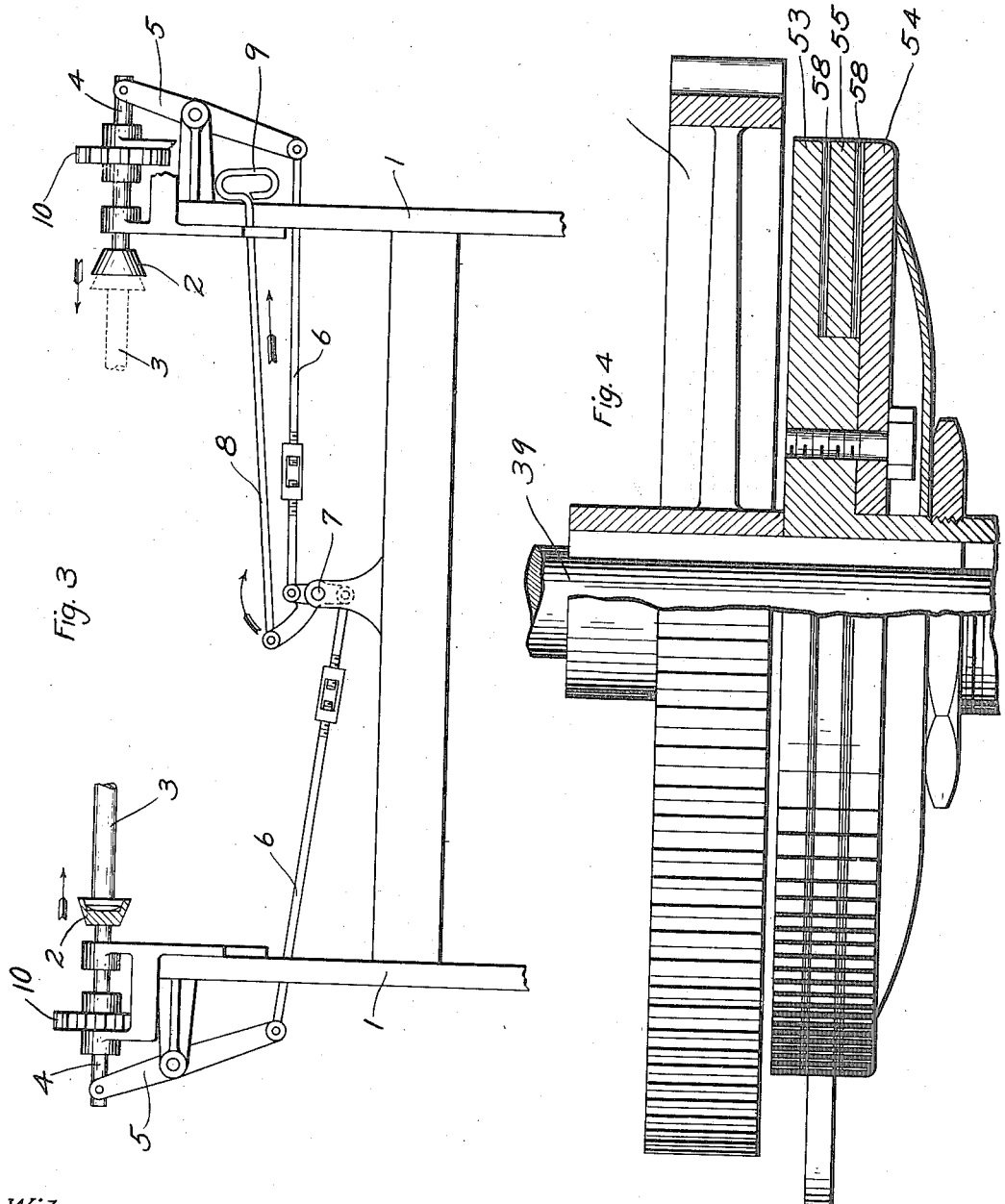

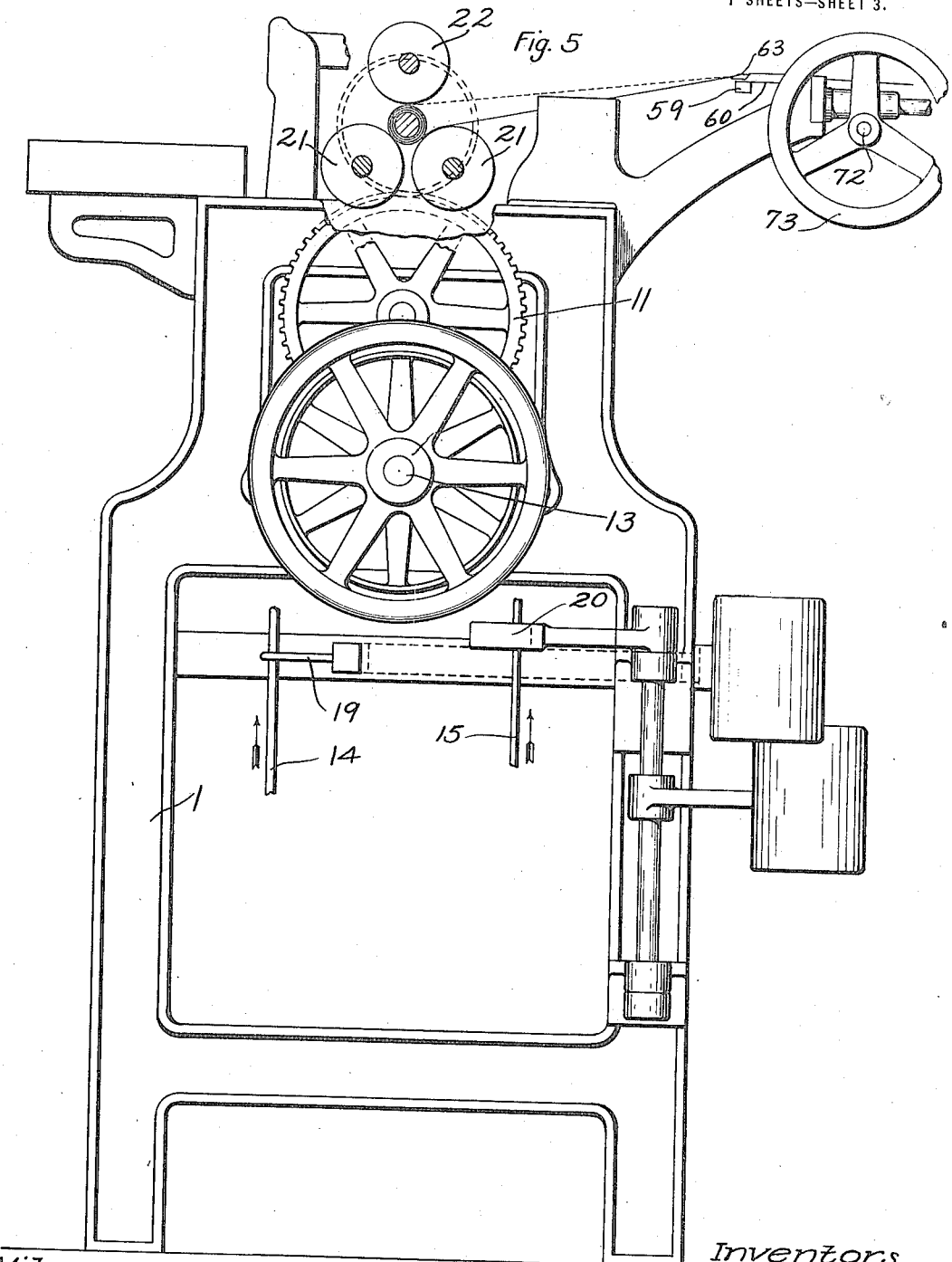

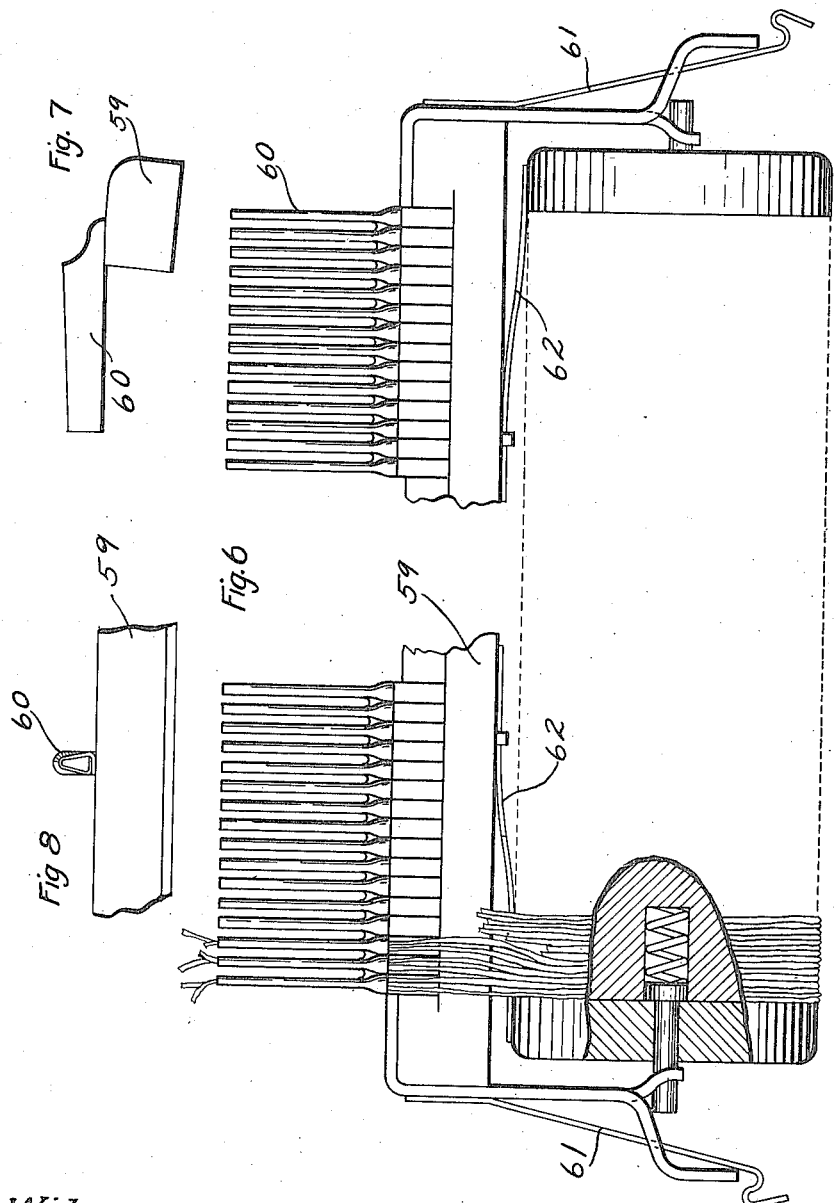

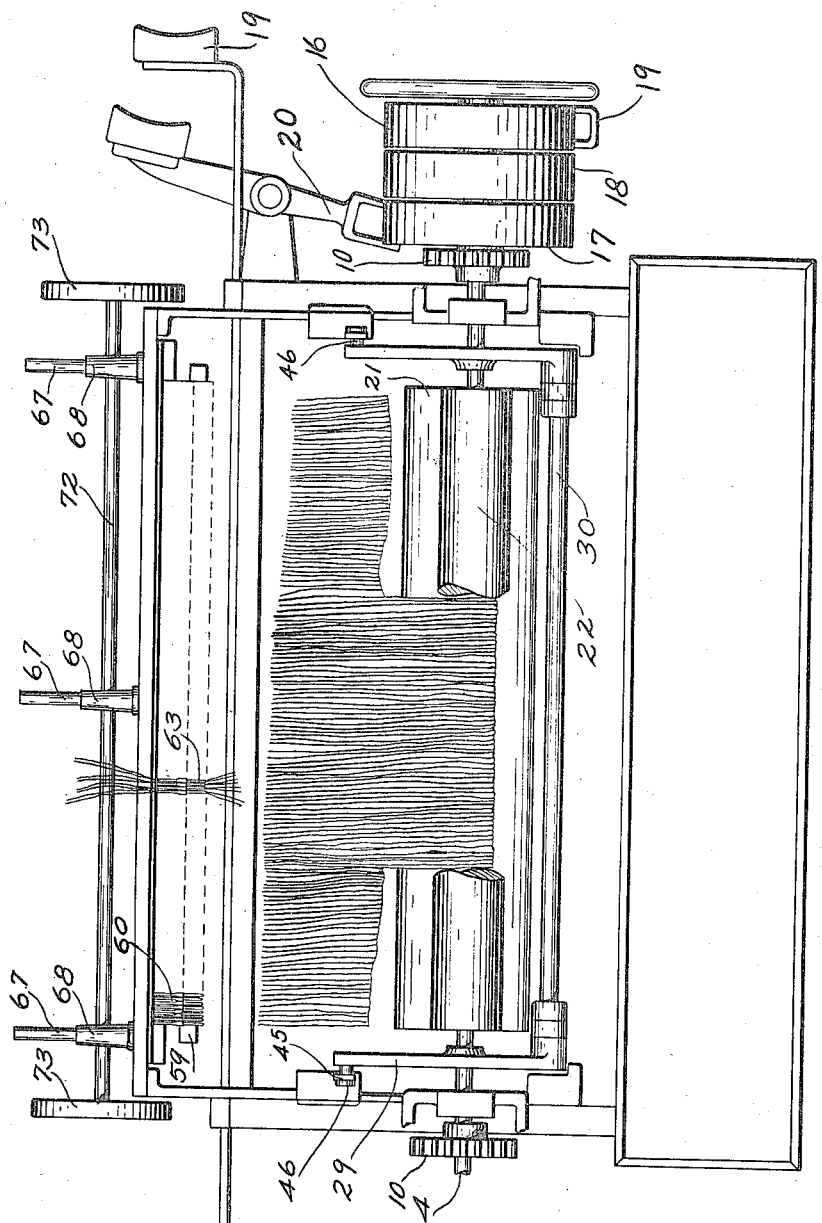

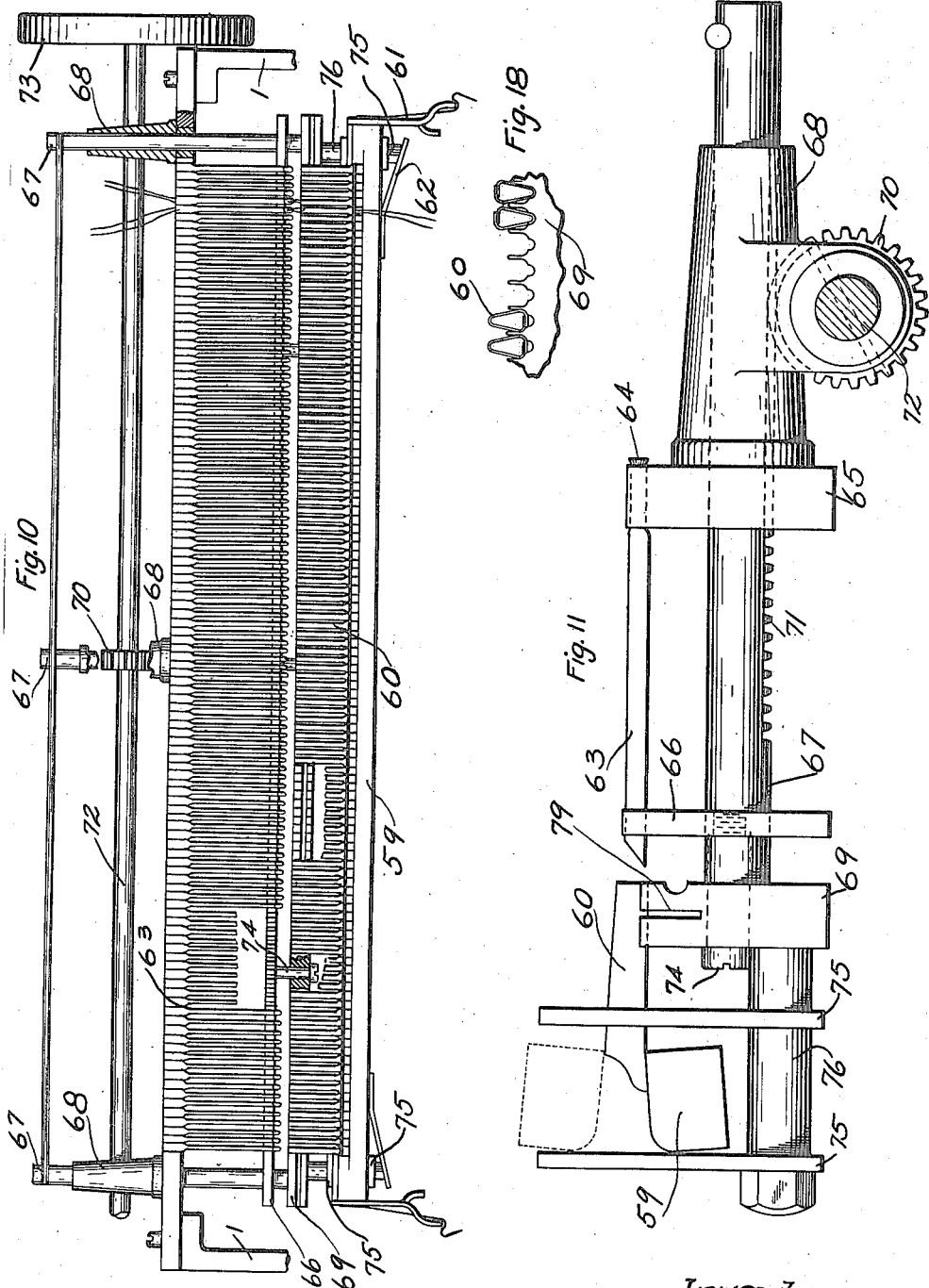

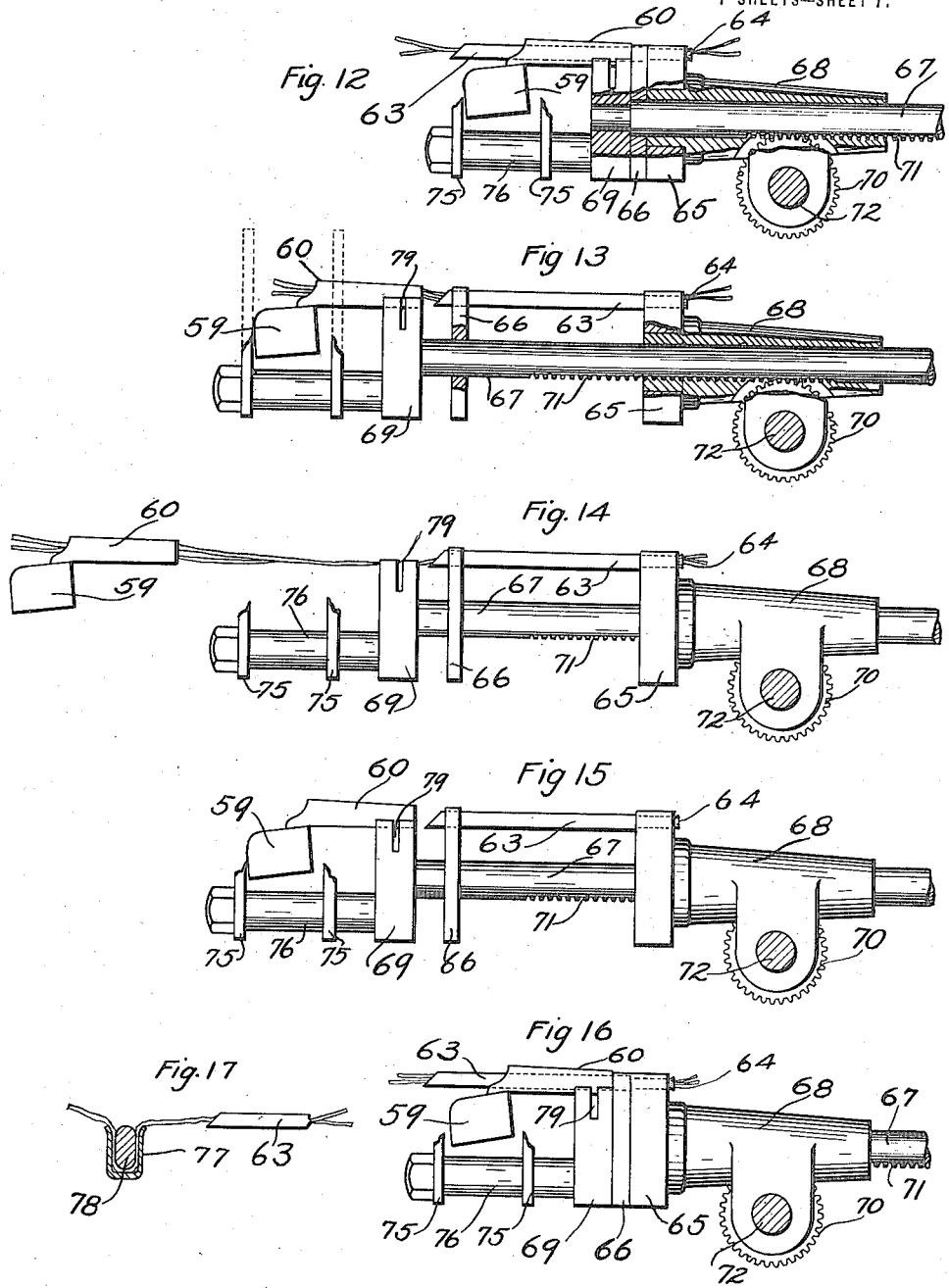

UNITED STATES PATENT OFFICE.

EDGAR F. HATHAWAY, OF DORCHESTER, AND CHARLES LEA, OF BOSTON, MASSACHUSETTS, ASSIGNORS TO AMERICAN WARP DRAWING MACHINE COMPANY, A CORPORATION OF MAINE.

MACHINE FOR HANDLING TUFT-YARNS FOR CARPET-LOOMS.

1,152,380.            Specification of Letters Patent.     Patented Aug. 31, 1915.

Application filed May 23, 1908. Serial No. 434,681.

*To all whom it may concern:*

Be it known that we, EDGAR F. HATHAWAY and CHARLES LEA, both citizens of the United States, and residing, respectively, at Dorchester and Boston, both in the county of Suffolk and State of Massachusetts, have invented an Improvement in Machines for Handling Tuft-Yarns for Carpet-Looms, (Case B,) of which the following description, in connection with the accompanying drawings, is a specification, like letters on the drawings representing like parts.

Our invention relates to the manufacture of carpets or rugs of the Axminster and similar types, being more particularly concerned with the provision of improved means for placing the tuft-yarns, customarily used in the weaving of such carpets or rugs, in the separate tubes of a tube frame of the type ordinarily employed in connection with carpet looms of this class.

One object of our invention is to so facilitate and simplify this operation that it may be performed with the minimum of cost, both as regards the time of the operator and the waste of material, and also that such operation may be simplified and rendered certain and accurate while carried out by steps largely or wholly automatic.

Heretofore machines have been devised for placing the tuft-yarns through the tubes by means of a single needle, the latter passing successively through the tubes and drawing the yarn therethrough by successive reciprocations, this also requiring the coöperation of the operator, who places successive strands of the tuft-yarns in position to be seized by the needle. It has also been proposed to employ a tubing machine, as it may be termed, using a series of needles, one for each tube, adapted simultaneously to pass through the tubes and draw the entire series of yarn strands through the tubes at one operation. In each case, however, the tubing operation has contemplated the removal of the spool, upon which has been wound the tuft-yarns, from the spooling machine to a separate machine or apparatus. This not only involves additional labor but also the likelihood of disturbing the separated or pattern-arranged condition in which the tuft-yarns leave the spooling machine and consequently disarranging the pattern. In such machines it requires much time and attention on the part of the operator to see that the tuft-yarns are properly separated in exactly the intended arrangement before they are drawn into the tube.

Our invention contemplates the tubing of the tuft yarns in the exact intended relation without the necessary exercise of any particular care or attention on the part of the operator, and without any material addition to the time required for spooling the tuft-yarns. Preferably, though not necessarily, as in the illustrated embodiment of our invention, this is accomplished as a subordinate step of the spooling operation, and also preferably though not necessarily, by devices which are themselves attached to, or operatively associated with, the spooling machine, so that each spool when wound and taken off from the machine is taken off with the tube frame attached and the tuft-yarns each properly placed in its proper tube.

Our invention will be best understood by reference to the following description when taken in connection with the accompanying illustration of one specific embodiment thereof, while its scope will be more particularly pointed out in the appended claims.

In the drawings: Figure 1 is a side elevation of a spooling machine, to which is shown applied one form of our invention; Fig. 2 is a similar elevation shown, however, in partial section; Fig. 3 is a front elevation of the mechanism for receiving the spool; Fig. 4 is a detail, partly in section, showing the retarding device for the roller releasing mechanism; Fig. 5 is an end view of the spooling machine, showing the driving mechanism for the spool; Fig. 6 shows, partly broken away and partly in section, a spool with the tube frame attached and the tuft-yarns at one end shown wound upon the spool and passing through the tubes; Fig. 7 is an end view of the tube frame; Fig. 8 is a front view of the portion of the tube frame shown in Fig. 7 looking in the direction of the tubes; Fig. 9 is a plan view of the spooling machine, showing the tubing devices attached thereto; Fig. 10 is a plan view of one end of the spooling machine, showing the tubing devices attached thereto; Fig. 11 is an end elevation, on an enlarged scale, showing the construction of the hollow yarn guides and the tube frame holder; Figs. 12 to 17 are views showing the relation of the hollow yarn guides to the tube frame and tube frame holder during successive steps in the operation of the machine; and Fig. 18 is a detail showing the recesses for the tubes in the guide support.

Referring to the drawings and to the particular embodiment of our invention there shown, we have illustrated the same as applied to a common and well-known type of spooling machine which, however, for the sake of fully understanding the nature of our invention, we will briefly describe as follows, it being understood that our invention is not limited to this or any particular construction of spooling machine, nor, in its broad aspects, to a mechanical attachment to or associated with, a spooling machine of any form or construction.

The specific form of spooling machine (see particularly Figs. 1 to 5) is provided with suitably connected upright end frame members 1, carrying supports, such as the cone-shaped clutch members 2 (Fig. 3) for receiving the ends of a spool 3 of the usual construction such, for example, as is diagrammatically or conventionally shown in Fig. 3 but fully shown in detail in Fig. 6. Each spool support 2 is connected to a sliding shaft or rod 4, and, through the employment of levers 5, links 6, rock shaft 7 and the rod 8 with its attached handle 9, the said members may be thrown inwardly to engage the ends of the spool and hold the latter securely in position on the machine, as is represented in Figs. 3 and 5. Each rod 4 has a splined connection with a driving gear 10, the latter meshing each with a gear 11, which latter is driven by a gear 12 upon the driving shaft 13.

Power is supplied to the driving shaft 13 in any suitable manner (Fig. 5) as by the oppositely driven belts 14 and 15, which may be shipped, respectively (Fig. 9), from the loose pulleys 16 or 17 to the tight pulley 18 by means of their respective shipping levers 19 and 20. This permits the operator to impart winding movement to the spool, under power, in either direction at will, or to stop the winding movement thereof.

The periphery of the spool when placed in position rests against the surface of a pair of friction rollers 21, while a third roller 22 is placed in engagement with the said spool from above, so that the tuft-yarns are wound upon the spool while pressed against the same by the three friction rollers and thereby wound evenly and tightly upon the spool with the same pattern-arranged separation as is provided for by the reed or other yarn separating device used upon the machine.

The two friction rollers 21 are supported at each end in a bracket 23, the latter capable of depression as the wound-on yarn increases the effective outside diameter of the spool. The brackets 23 are secured to the pivoted arms 24, the latter pivoted upon the frame pieces at 25 and having their outer ends connected, respectively, to ropes, bands or other suitable connections 26, which latter pass over suitable sheaves or pulleys 27 and are attached to appropriate weights 28, the latter, therefore, normally causing the rollers 21 to press upward against the spool and the yarn.

The roller 22 is journaled at its opposite ends in arms 29, which latter are united by the rod 30, mounted for vertical, sliding movement at each end in slotted guides 31. Each end of the rod 30 is secured to a depending connecting link 32, the latter attached to one end of the lever 33. The opposite end of the lever has the weight 34 tending to throw the rod 30 toward its upward limit of movement in the slotted guides. The weighted end of each lever 33 is also connected to the strap 35, provided at its upper end with a slot 36, in which works a pin 37, the latter carried by one arm of the rocking actuator 38, which is secured to the roll releasing shaft 39. Another arm of the rocking actuator 38 is secured to a link 40 having at its upper end the slot 41 engaging a pin 42 on the end of the pivoted lever 24. A third arm on the actuator carries a roll 43 engaging with the under side of the pivoted lever 44 attached to the upright member 45, which latter, at its upper end, is hooked shaped to engage with a laterally and outwardly extending pin 46 on the adjacent arm 29 which carries the roller 22.

When the releasing shaft 39 is turned in the direction of the arrow, as shown in Fig. 1, as by the crank 47, handle 48 and intermeshing gears 49 and 50 (shown in Fig. 1), the rocking member 38, through its roll 43 acting on the lever 44, will first lift the hooked members 45, releasing the arms 29 and the roller 22 and then subsequently will draw down the link 40, lever 24 and the under rolls 21, and also draw up the link or strap 35 and draw down the links 32 and the connecting rod 30. As the rod 30 is drawn down through the slotted guides 31, the arms 29 are caused to engage lugs 51, which cause the arms to be moved to bring the attached roll in the dotted line position shown in Fig. 2. The released position of the hooked members 45 is also shown by dotted lines in the said figure. In this open or released relation of the rolls the spool 3 may be inserted and the tuft-yarns wrapped around the same, preparatory to winding on, after which the rolls are again closed in and the machine started up for winding the spool. To adjust or close in the rollers the crank 47 is turned in the opposite direction, reversing the movements of the rocking lever 38 and causing the parts to reassume the position shown in Fig. 2. The lever 44 is provided with a weight 52 suspended thereon, tending normally to draw it down to the position shown.

In Fig. 4 we have shown a usual form of device customarily employed to retard the final or closing movement of the parts in either the closing or releasing of the rolls. This comprises a disk 53 fixedly secured to the releasing shaft 39 between which disk and the plate 54 bolted thereto is a frictionally mounted annular plate 55, having radially projecting teeth or lugs 56 (Fig. 1) which, near the extreme end of its movement in either direction are adapted to engage with the plate 57 fixed upon a part of the frame, subsequent movement of the shaft 39 taking place under the retarding friction of the annular plate 55 against the adjacent disk 53 and plate 54. Friction material 58 of any suitable nature is provided between the parts.

The parts and mechanism of the specific machine described are submitted merely for illustrative purposes to better aid an understanding of our invention, the said mechanism being well-known in the art and requiring no further description. The machine shown is submitted merely as typical of a spool-winding machine which specifically forms no essential part of our invention, except in so far as such a type of machine, or in its essential parts, may enter broadly into combination with the hereinafter described improvements.

In Figs. 6 to 8 we have illustrated the usual form of tube frame 59, with the series of tubes 60 attached thereto in the customary way, the frame being provided, as is usual, with the end spring 61 for attachment to the spool and the spring clips 62, which engage with the ends of the spool and tend frictionally to hold it in a fixed position thereon.

In the illustrated form of our invention the yarn strands lead to the machine from the bobbin frame (not shown) and, in passing to the winding spool, when the latter is in position upon the machine frame, each strand or group of strands is separated from the adjacent one of the series, this being accomplished in the illustrated form of machine by causing the same to pass each through one of a series of guiding and separating devices, herein in the form of tubular yarn guides 63 arranged in a horizontal parallel series. The yarn guides 63 serve to separate a selected strand or group of strands each from the other and also to hold the strands in alinement with the tubes through which they are to be placed.

Referring more particularly to Figs. 10 and 11 each yarn guide has a cylindrical bell-mouthed outer end 64 by which it is fixedly held in flat horizontal position on the guide bar 65, the latter rigidly held at its ends (Fig. 10) to the frame members 1 of the machine. The major or body portion of each yarn guide is flattened and its inner or forward end which preferably presents a beveled mouth or opening, rests in a slot or groove provided in the upper edge of the sliding guide bar 66. The guide bar 66 is mounted for free sliding movement upon a plurality of rack bars or rods 67, which latter are slidably mounted in horizontal guide supports 68 secured to the guide bar 65. The forward or opposite ends of the rack bars are fixedly connected to the tube guide bar 69, which latter is notched or grooved on its top face transversely, as shown more in detail in Fig. 18, to receive the ends of the tubes 60 of the tube frame and hold them in fixed alinement with the yarn guides 63.

The rack bars 67 are adapted to be reciprocated within the guiding supports 68 each by means of a pinion 70 engaging teeth 71 on the under side of the rack bar, the pinions being keyed to a shaft 72, which has a hand wheel 73 at each end, by which it may be turned and the rack bars reciprocated, carrying with them the tube guide bar 69. The guide bar 66 is connected to headed pins 74 (Fig. 10), which latter pass loosely through apertures in the tube guide bar 69, whereby the latter can withdraw from the guide bar, as shown in Figs. 10 and 11. When, however, the pins 74 are drawn along by the rack bar in the direction of the yarn-guide support 65, they push the guide bar 66 ahead of the same into some such position as is shown in Fig. 16.

The tubes 60 are held in their tube guide bar 69 in such position that when the guide bar is moved in the direction described, each tube is moved toward its corresponding and alining tubular yarn guide 63 so as to slide over and envelop the same. Pairs of fingers 75 fixedly secured to the studs 76 are provided at each end of the guide bar 69, the tube frame, when in position, resting in between these fingers, so that, as the fingers move with the guide bar toward or from the bar 65, they engage with the tube frame and force the tubes onto or off from the tubular yarn guides.

The tuft yarns are initially threaded through the tubular yarn guides in any selected order of sequence, the said guides serving the function of separating the tuft-yarns after the manner of the usual reed or other spacing device employed in connection with this class of machines. This threading is easily accomplished by reason of the bell-shaped mouth 64. Such initial threading is required only when the pattern is changed or when the thread on a given bobbin breaks or runs out. With the yarn strands drawn through their respective yarn guides, a tube frame is then placed in the tube frame guide 69, as represented in Fig. 11 and the shaft 72 turned in a direction to force the tubes over the yarn guides and into a position represented in Fig. 12, where each tube has passing through it its corresponding tubular yarn guide, together with the yarn strand or group of strands passing through such guide. The free ends of the yarn strands which protrude from the beveled mouths of the yarn guides are then clamped by any suitable form of clamping means, such, for example, as that shown in Fig. 17, the same comprising the channel piece 77 preferably of metal or other resilient material and the insertion bar 78, the latter covered, if desired, with felt or other friction material. The clamped yarn strands are then wrapped in the usual manner about the spool 3, which has been previously placed in the machine, as is represented in Fig. 5. With the tube in this position the spooling is then carried out as usual and as previously described. When the spooling or winding operation is completed, the rotation of the spool is stopped and the shaft 72 turned reversely to force the tubes, then in the position shown in Fig. 12, off from the tubular yarn guides and directly on to the yarn strands into the position represented in Fig. 13. From this position the tube frame may be then lifted and slid along the yarn strands, as represented in Fig. 14, whereupon the yarn strands, which now lie directly across the groove 79 in the top of the tube, frame guide may be severed by drawing a knife along the said groove, or by any other desired severing means. The tube frame may then be attached to the spool, as represented in Fig. 6, and the latter withdrawn from the machine to be replaced by another spool upon which the next load of yarn is to be wound. The protruding ends of the tuft-yarns are then brushed out of the groove 79 so as to lie back over the beveled mouths of the yarn guides and a new tube frame is then inserted in the tube frame guide, as represented in Fig. 15. The tubes are then pushed over the yarn guides as before to the position shown in Fig. 16, and, the free ends being clamped as before, the operation is repeated.

It frequently happens that it is necessary to reverse the pattern arrangement of the yarn as wound upon any given spool where, for example, a certain pattern arrangement is used at one side of the center line of a rug, and a symmetrical, but reverse, pattern arrangement is employed upon the opposite side of the center thereof. In such cases it is customary, to avoid rearranging the order of the tuft-yarns, merely to reverse the relation of the tuft strands relatively to the tubes of the tube frame, so that the strands are placed through the tubes in reverse order. In the described machine this is accomplished by winding the yarn on the spool in the direction shown by dotted lines in Fig. 5, and then inserting the tube frame into the tube frame guide, as shown at the right in Fig. 18, and in dotted lines in Fig. 12, that is to say, with the frame piece or bar 59 turned up instead of down. The grooves or notches in the tube frame guide for receiving the tubes are so constructed, as will be seen in Fig. 18, that they will receive either the narrow or the wide edges of the tubes. The tubing operation, under such circumstances, is accomplished in precisely the same way as described, but the tubes, when the strands are placed therethrough, will bear a reverse relation from end to end to the pattern arrangement of the strands.

It will be obvious that we have herein described and shown the disclosed embodiment of our invention for illustrative purposes only, and that the latter is not limited to the details of construction or form or relative arrangement of parts, but that, on the contrary, extensive deviations may be made from those shown without departing from the spirit of our invention.

Having thus described our invention, what we claim is:

1. In a machine for acting upon tuft-yarns, the combination with spool-winding means, of means associated therewith for tubing the yarns before the winding operation.

2. In a machine for acting upon tuft-yarns, the combination with winding means, and separating means, of means for tubing the separated yarns before the winding operation.

3. In a machine for acting upon tuft-yarns, the combination with a series of devices for holding the yarns separated, said devices being adapted to pass through the tubes of the tube frame, and means for placing the tubes of said frame over the said devices.

4. In a machine for acting upon tuft-yarns, the combination with a series of devices for holding the yarns separated, said devices being adapted to pass through the tubes, means for placing the tubes over the said devices, and means for winding the yarn.

5. In a machine for acting upon tuft-yarns, the combination with a series of devices for holding the yarns separated, said devices being adapted to pass through the tubes of a tube frame, means for placing the tubes over the said devices, and means for drawing the tuft-yarns through the said tubes with their contained separating devices.

6. In a machine for acting upon tuft yarns, the combination with a series of devices for holding the yarns separated, said devices being adpated to pass through the tubes of a tube frame, of means for placing the tubes over said devices to permit the tuft yarns to be drawn through the tubes and their contained separating devices and for subsequently withdrawing the tubes to permit the severance of the tuft yarns between the tubes and the separating devices.

7. In a machine for acting upon tuft-yarns, the combination with a series of individual yarn-holding and guiding devices, of means for placing the same with the associated yarns through the tubes of the tube frame, and means for causing the relative withdrawal of the said devices from the tubes while still engaged with the yarns, and, at the same time, leaving the yarns passing through the tubes.

8. In a machine for acting upon tuft-yarns, the combination with a series of individual tubular yarn guides adapted to pass through the tubes of a tube frame, means for placing the same with the associated yarns through the tubes, and means for causing the relative withdrawal of said tubular yarn guides from the tubes while leaving the yarns passing through the tubes and the tubular guides.

9. In a machine for acting upon tuft-yarns for carpet looms the combination with means for holding tuft-yarns of a tube frame holder and means for moving the same to cause the tubes to pass over the yarns.

10. In a machine for acting upon tuft-yarns, the combination with tube holding means, of tubular yarn placing means through which the yarn is adapted to pass.

11. In a machine for acting upon tuft-yarns, the combination with yarn holding means, tube frame holding means, and means for moving the tube frame toward the yarn-holding means to tube the yarns.

12. In a machine for acting upon tuft-yarns, the combination with the tube 60 of the tubular placing devices 63 through which the yarn is adapted to pass.

13. In a machine of the kind described, means to support the yarn guide tubes, and yarn-placing means operating to position the yarns through the tubes from the small yarn-delivery, weaving end of the latter to the large, opposite end thereof into which the yarn moves when it is being delivered in the process of weaving.

14. A machine of the kind described, comprising means to position a complement of yarns through the tubes of a tube frame, and means for thereafter winding said yarns on a spool.

15. In a machine of the kind described, means for supporting a spool in position to receive a complement of yarns, means to support the yarn guide tubes, and yarn-placing mechanism operable to position the yarns through the tubes prior to the delivery of the yarns to the spool.

16. In a machine of the kind described, spool winding mechanism, yarn-placing mechanism, and means to operate the latter before the former to place the yarns through the tubes of a tube frame before the winding thereof.

17. In a machine of the kind described, the combination with means for delivering a complement of yarns from a general stock of yarn supply, and means for supporting a tube frame, of yarn severing mechanism, and yarn-placing mechanism operating to position the yarns through the tubes of the tube frame prior to their being severed and while the yarns are still intact with the said source of supply.

18. In a machine of the kind described, the combination with means for delivering a complement of yarns from a source of yarn supply, and means for supporting a tube frame, of yarn severing mechanism, means to support a spool in position to receive said complement of yarns, and yarn-placing mechanism operating to position the yarns through the tubes of the tube frame prior to their being severed and while the yarns are still intact with the said source of supply.

19. In a machine of the kind described, means for supporting the tube frame, and yarn severing means, combined with yarn-placing mechanism for delivering a complement of yarns from a general stock of yarn supply through the yarn guide tubes, from the small end to the large end of the latter while the yarns are still intact with the said source of supply.

20. In a machine of the class described spool winding mechanism, means for supporting a tube frame, and means for placing the yarns through the tubes before being wound, said tubes being positioned in relation to the spool to permit the subsequent winding operation.

21. In a machine of the kind described, means for delivering a supply of yarns, winding mechanism for winding yarns therefrom on a spool, means for supporting a tube frame, yarn-placing mechanism for drawing in said yarns through the tubes of the tube frame, severing mechanism for severing the yarns from said supply subsequent to the winding and drawing-in operations, and means for straightening out and maintaining in proper separated relation the severed ends of the supply yarns.

22. In a machine for acting upon tuft-yarns, the combination with a series of devices for holding the yarns separated, means for supporting a tube frame, and means for placing the tubes of said frame over the said devices.

23. In a machine for acting upon tuft-yarns, the combination with a series of devices for holding the yarns separated, means for supporting a tube frame, means for placing the tubes over the said devices, and means for winding the yarn.

24. In a machine for acting upon tuft-yarns, the combination with a series of devices for holding the yarns separated, means for supporting a tube frame, means for placing the tubes over the said devices, and means for positioning the tuft-yarns through the said tubes by a relative movement of the tube frame and said devices.

25. In a machine for tubing tuft yarns in carpet manufacture the combination with means for holding a series of yarn guide tubes with relation to a series of yarns to be threaded therethrough of a series of thread placing devices for threading the yarns through the tubes, and means to cause relative movement between the series of tubes and the series of thread placing devices to cause the latter simultaneously to carry the threads when they assume a position within the tubes, the yarns and said thread placing devices initially entering the tubes from the same side.

26. In a machine for tubing tuft yarns in carpet manufacture the combination with means for holding a series of yarn guide tubes with relation to a series of yarns to be threaded therethrough of a thread placing device, and means to cause relative movement between a tube and the thread placing device to cause the latter to carry a yarn and assume a position within the tube, the yarn and said device initially entering the tube from the same side.

27. In a machine for tubing tuft yarns for carpet manufacture the combination with tube frame holding means to hold a series of yarn guide tubes with relation to a series of yarns to be threaded therethrough of a series of threading devices, means to cause relative movement between the series of devices and the series of tubes, first to position the threading devices through the tubes and then to position them without the same, said devices carrying the yarns within the tubes on the first of said positioning movements.

28. In a machine for tubing tuft yarns for carpet manufacture, the combination with tube frame holding means to hold a series of yarn guide tubes with relation to yarn to be threaded therethrough of a thread placing device, means to cause relative movement between the thread placing device and a tube, first to position the threading device through the tube and then to position it without the same, said device carrying a yarn within the tube on the first of said positioning movements.

29. In a machine for tubing tuft yarns in carpet manufacture the combination with means for holding a tube frame with relation to a series of yarns to be threaded through the guide tubes of said frame, said yarns being held at one side of the tube frame, a series of thread placing devices alined each with the open end of a tube and having an initial position at the same side of the tube frame as the yarns, and means to cause relative movement between the tubes and the thread placing devices to cause the latter to carry the yarns and thread them on their first movement through the tubes.

30. In a machine for tubing tuft yarns in carpet manufacture, the combination with means for holding a tube frame with relation to yarn to be threaded through the guide tubes of said frame, said yarn being held at one side of the tube frame, a thread placing device adapted to be alined with the open end of a tube and having an initial position at the same side of the tube frame as the yarn, and means to cause relative movement between the tube and the thread placing device to cause the latter to carry the yarn and thread it on its first movement through said tube.

In testimony whereof, we have signed our names to this specification, in the presence of two subscribing witnesses.

EDGAR F. HATHAWAY.
CHARLES LEA.

Witnesses:
   THOMAS B. BOOTH,
   IRVING U. TOWNSEND.